United States Patent
Assaf

(10) Patent No.: US 7,277,487 B2
(45) Date of Patent: Oct. 2, 2007

(54) PICTURE SEGMENT CODING WITH MOTION PREDICTION

(75) Inventor: Nadine Assaf, Paris (FR)

(73) Assignee: Alcatel, Paris (FR)

( * ) Notice: Subject to any disclaimer, the term of this patent is extended or adjusted under 35 U.S.C. 154(b) by 594 days.

(21) Appl. No.: 09/865,733

(22) Filed: May 29, 2001

(65) Prior Publication Data
US 2003/0165194 A1    Sep. 4, 2003

(30) Foreign Application Priority Data
May 30, 2000    (FR) .................................. 00 06954

(51) Int. Cl.
*H04N 7/12* (2006.01)
*G06K 9/36* (2006.01)

(52) U.S. Cl. ................. 375/240.16; 382/236

(58) Field of Classification Search .......... 375/240.12, 375/240.09, 240.16, 240.27; 348/699, 700, 348/420.1, 416.1, 402.1, 399.1, 412.1, 399, 348/416; 382/236
See application file for complete search history.

(56) References Cited

U.S. PATENT DOCUMENTS

| | | | | |
|---|---|---|---|---|
| 5,016,102 A | * | 5/1991 | Avis | 348/452 |
| 5,469,226 A | * | 11/1995 | David et al. | 348/699 |
| 5,838,829 A | * | 11/1998 | Kim | 382/242 |
| 6,141,448 A | * | 10/2000 | Khansari et al. | 382/236 |
| 6,611,561 B1 | * | 8/2003 | Hannuksela et al. | 375/240.27 |

FOREIGN PATENT DOCUMENTS

| | | |
|---|---|---|
| EP | 0 395 271 A2 | 10/1990 |
| EP | 0 535 746 A2 | 4/1993 |

OTHER PUBLICATIONS

International Telecommunication Union: Draft Text of Recommendation H.263 Version 2 "H.263+"—Transmission of Non-Telephone Signals: Video Coding for Low Bit Rate Communication, Jan. 27, 1998, XP002160606.

M. Bierling, "Displacement estimation by Hierarchical Blockmatching" Visual Communications and Image Processing '88, Cambridge, MA, USA Nov. 9-11, 1988, vol. 1001, pt. 2, pp. 942-951, XP000863657.

* cited by examiner

*Primary Examiner*—Gims Philippe
(74) *Attorney, Agent, or Firm*—Sughrue Mion Pllc.

(57) ABSTRACT

A picture coding method for transmission on a channel at a low bit rate and with a high error rate, for example, a channel with a bit rate less than 100 kbit/s and an error rate greater than $10^{-6}$, or even $10^{-4}$. The method uses motion estimation coding and divides the picture into a plurality of segments made up of macroblocks. At least for an edge macroblock of a segment, a motion estimation vector is allowed to extend into an adjacent segment. This is particularly advantageous for macroblocks situated top right of the segment if scanning for motion vector estimation is from left to right and top to bottom. Errors caused by estimating motion vectors within segments are avoided and the propagation of coding errors caused by splitting the picture into segments is limited.

13 Claims, 1 Drawing Sheet

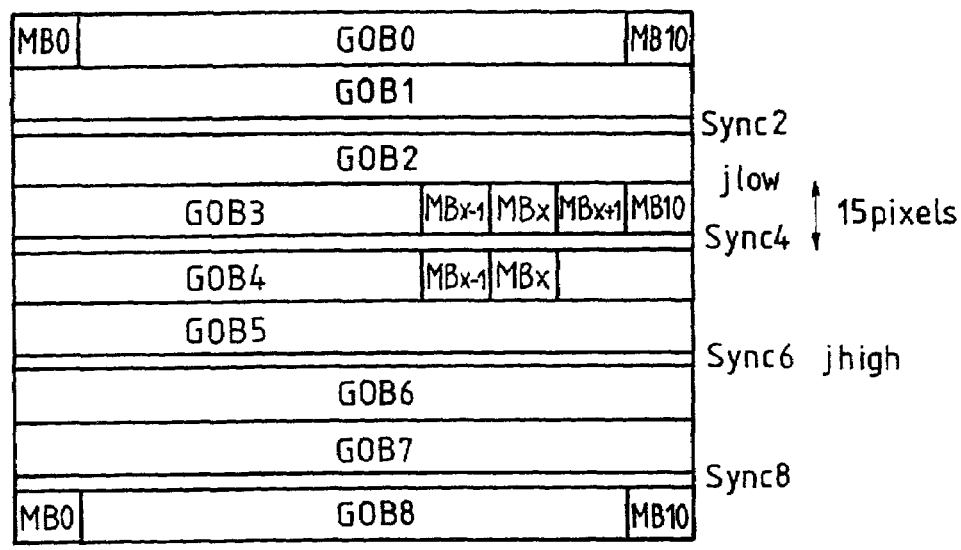
FIG_1
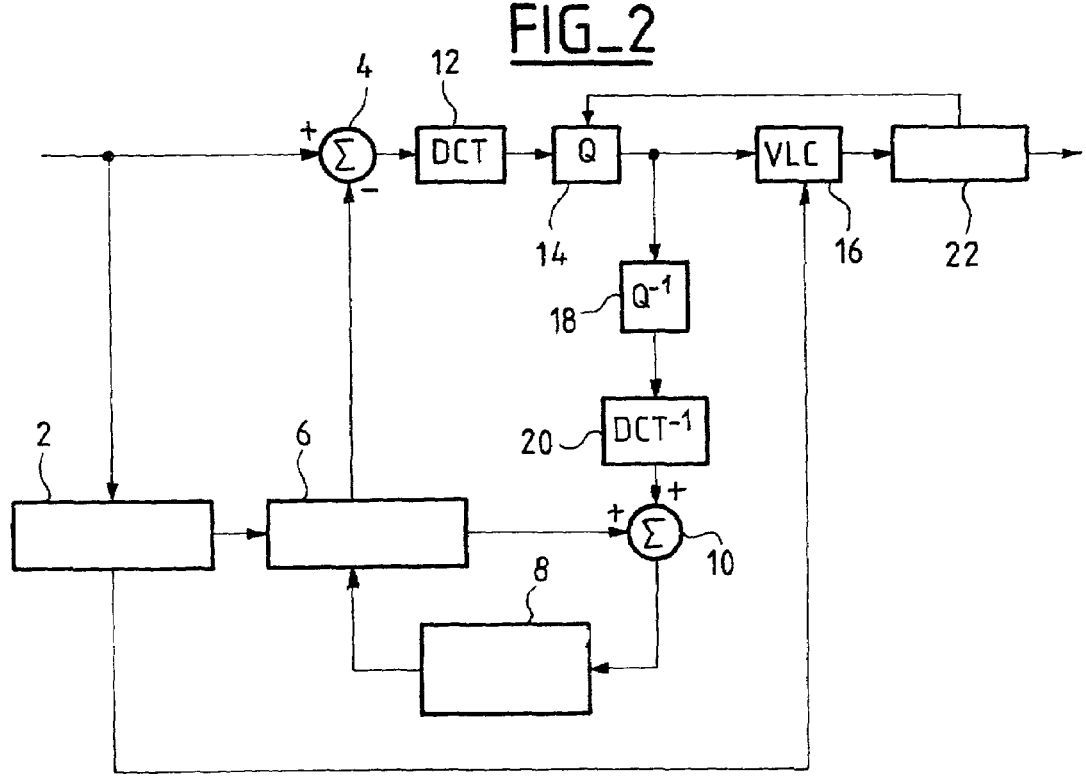
FIG_2

PICTURE SEGMENT CODING WITH MOTION PREDICTION

The present invention relates to coding and more specifically to video source coding for wireless transmission.

BACKGROUND OF THE INVENTION

Wireless transmission is characterized by a relatively low transmission bit rate and a high error rate. Where the transmission bit rate is concerned, a low bit rate means bit rate values less than 100 kbit/s, for example GSM channels at 14 kbit/s. High error rates means error rates greater than $10^{-6}$, or even greater than $10^{-4}$.

The ITU-T H.263+ standard proposes solutions for video source coding. The standard comprises an obligatory common part and a set of optional appendices which can be implemented in addition to the common part of the standard. The standard gives no indication as to the quality of the pictures obtained or the combination of appendices that apply in given circumstances, in particular for wireless transmission. Implementing all the appendices yields a system that is difficult to apply to wireless transmission because of the low transmission bit rate available and the error rate.

The common part of the H.263+ standard proposes block coding with prediction. A distinction is made in a sequence of pictures between pictures that are transmitted integrally (referred to as "I" pictures), pictures that are not transmitted integrally but predicted from a preceding picture (referred to as "P" pictures), and pictures that are not transmitted integrally but which are predicted from a preceding picture and a succeeding picture. The coding process uses the following steps for a picture including blocks or macroblocks made up of a plurality of blocks, typically six blocks, of which four are luminance blocks and two are chrominance blocks:

estimating motion of blocks or macroblocks of each picture,
    predicting motion compensation relative to a reference picture, and
    coding for transmission, typically by coding with compression (including discrete cosine transform (DCT), quantizing and variable length coding (VLC)).

Appendix R of the above standard, entitled "Independent segment decoding mode", proposes to use video picture segments made up of a set of blocks for motion estimation processing; motion is estimated independently in each segment. In this case, the boundaries of a segment are treated as boundaries of the picture for the purposes of decoding, including for the purposes of processing motion vectors that cross boundaries. Motion vectors that cross boundaries are prohibited in the absence of the optional modes of appendix D, F, J and O. If the unrestricted motion vector mode of appendix D is used, the boundaries of the current video picture segment are extrapolated to constitute predictions of pixels outside segment regions.

Appendix N of the standard, entitled "Unrestricted motion vector mode", proposes an exception to the principle stated in the common part of the standard, whereby motion vectors are restricted so that all the pixels to which they refer are in the coded area of the picture. To be more specific, appendix N proposes that motion vectors be allowed to point outside the picture. If a pixel to which a motion vector refers is outside the coded picture surface, an edge pixel is used in its place. The value of the edge pixel is obtained by limiting the motion vector to the last position corresponding to an entire pixel within the coded picture surface. Motion vector limitation is based on one pixel and is implemented separately for each component of the motion vector.

Other appendices propose that the motion vectors be allowed to cross the boundaries of a picture or picture segment. This applies to appendices F, entitled "Advanced prediction mode", J, entitled "Deblocking filter mode", and O, entitled "Temporal, SNR and spatial scalability".

OBJECTS AND SUMMARY OF THE INVENTION

The invention proposes a solution to the problem of transmission at low bit rates with high errors rates. The problem of the effects of block coding and motion vector limitation arises in this particular context. It arises in a specific and acute manner in the context of transmission at low bit rates and with high error rates in that the errors that occur are difficult to correct by retransmission or by means of an error-correcting code, because of the time-delay this would cause. Also, the low bit rate cannot be compensated by a lower number of errors.

This problem arises in a particular manner for macroblocks on the right-hand side and at the top edge of a segment, because of predictive coding, and more specifically because of the macroblock scanning direction: it is standard practice to determine motion vectors by scanning the picture from left to right and top to bottom.

One effect of segment coding as proposed in appendix R is to limit the effect of transmission errors. From this point of view, appendix R strictly applies to the particular context of transmission at low bit rates, and is contrary to the suggestion in appendix R of envisaging that motion vectors be allowed to leave the frame of the segment in the context of transmission at low bit rates.

The invention therefore proposes a picture coding method for transmission on a channel at a low bit rate and with a high error rate, which method uses motion estimation coding and divides the picture into a plurality of segments made up of macroblocks, wherein, at least for an edge block of a segment, a motion estimation vector is allowed to extend into an adjacent segment.

In one embodiment, for an edge macroblock of a segment, a motion estimation vector is allowed to extend into an adjacent macroblock of the adjacent segment.

For motion vector estimation the picture is preferably scanned from left to right and from top to bottom and, for macroblocks adjacent the top edge of a segment, a motion estimation vector is allowed to extend into an adjacent segment.

If, for motion vector estimation, the picture is scanned from left to right and from top to bottom, it is also advantageous, for macroblocks adjacent the right-hand edge of a segment, for a motion estimation vector to be allowed to extend into an adjacent segment.

In one embodiment, each segment is made up of two groups of blocks.

The invention applies in particular if the error rate is greater than $10^{-6}$, or even greater than $10^{-4}$ or if the transmission rate is less than 100 kbit/s.

The invention further proposes a coder implementing the above method. It also proposes a transmission system using a channel at a low bit rate and with a high error rate, the system including the above coder.

BRIEF DESCRIPTION OF THE DRAWINGS

Other features and advantages of the invention will become apparent on reading the following description of embodiments of the invention, which description is given by way of example and with reference to the accompanying drawings, in which:

FIG. 1 is a diagram showing one definition of video picture segments in a picture, and FIG. 2 is a diagram showing a coder according to the invention.

MORE DETAILED DESCRIPTION

The invention applies to motion vector coding transmission systems and is of particular benefit in the specific context of transmission systems operating at low bit rates and with high errors rates (these terms are defined above). If picture segments are defined for estimating motion vectors, the invention proposes to allow motion vectors for blocks or macroblocks defining the edge of the picture to overflow into the adjoining segments.

FIG. 1 is a diagram showing one definition of video picture segments in a picture. In the example, the picture is a QCIF picture and each segment is made up of two lines of macroblocks, limited by a synchronization signal. Each macroblock consists of four luminance blocks and two chrominance blocks, and each block consists of an 8×8 square of pixels. Synchronization is used not only to separate the segments but also to enable the decoder to resynchronize in the event of a transmission error in a segment. Separation into segments prevents transmission errors propagating over the whole picture.

In the example, each segment is made up of two lines of macroblocks Mbi. The lines of macroblocks are referred to as "group of blocks" GOBi. Each line of macroblocks is made up of eleven macroblocks and the picture is divided into nine groups of blocks, i.e. into four and a half segments for a picture comprising 176×144 luminance pixels. As shown in the figure, each segment is separated from adjacent segments by a synchronization signal.

According to appendix R of the H.263+ standard, which is discussed above, motion vectors are estimated inside segments. This solution has the advantage of limiting propagation errors, because each segment is coded independently of the adjacent segments. This solution is satisfactory, but has limitations in the context of transmission at low bit rates and with high error rates.

The invention proposes to relax this constraint on estimating motion vectors of edge macroblocks of a segment. To be more specific, when motion vectors are estimated by scanning the picture from left to right and from top to bottom, the motion estimation problem arises for the macroblocks that form the top and right-hand edges of each segment. Pixels top left and top right of the current pixel are then used for motion estimation; motion estimation within the segment is correct for the macroblocks on the left-hand side of the segment or at the bottom edge of the segment (for segments of more than two lines of macroblocks). However, motion vector limitation causes a problem for macroblocks at the top or right-hand edge of the segment. The invention proposes that the vector be allowed to have one end in one of the adjacent macroblocks of the adjacent segment.

The example shown in the figure considers the segment formed of the groups of blocks GOB4 and GOB5. That segment is limited at the top by a synchronization signal Sync4 and at the bottom by a synchronization signal Sync5.

Consider macroblock MBx of the group of blocks GOB4. It is one of the edge macroblocks of the segment. For estimating motion vectors of the pixels or blocks of the macroblock, the invention therefore proposes using not only the other macroblocks of the segment but also, where applicable, macroblocks of the segment formed of the groups of blocks GOB2 and GOB3. To be more specific, it is advantageous to use only adjacent macroblocks, in other words the macroblocks of group GOB3, or to be more specific the macroblocks MBx−1, MBx and MBx+1 of group GOB3.

FIG. 1 shows the line jlow which separates the groups of blacks GOB2 and GOB3 and the line jhigh which separates the groups of blocks GOB5 and GOB6. In this case, the macroblocks between the lines jlow and jhigh can be used to estimate the motion of a macroblock at the top edge of the segment, i.e. a macroblock of the group GOB4. The distance between the line jlow and the synchronization signal Sync4 is fifteen pixels.

The invention applies more particularly to the macroblocks on the right-hand side of a segment, as in the previous context of scanning the picture from left to right and top to bottom. In this case, if the motion vector were not allowed to cross the top edge of the segment, it would tend to be stretched horizontally, which would cause it to leave the picture. The invention avoids this problem. It is therefore particularly advantageous to apply the invention to the top right macroblock of the segment. In the FIG. 1 example this is the macroblock MB10 of the group of blocks GOB4 for the segment consisting of the groups GOB4 and GOB5.

For transmission at low bit rates with high error rates, the invention avoids errors caused by limiting the motion estimate to one segment. It improves the quality of the reconstructed picture and does not interfere with the constraints encountered in transmission at low bit rates and with high error rates, namely the transmission speed and the complexity and memory capacity of the coder or decoder. Because the motion vector estimate is nevertheless limited, the invention has the advantages of appendix R, i.e. it limits the propagation of errors.

The foregoing description does not specify which picture is the reference picture; the reference picture can be chosen in a manner that is known in the art, and can simply be the preceding picture, as in the FIG. 2 coder example.

FIG. 2 is a diagram showing a predictive coding system according to the invention. The video pictures at the input of the coding system are applied to a motion estimator 2 and to an input of a subtracter 4. The motion estimator supplies an estimate of the motion of blocks or macroblocks of the picture relative to the preceding picture; blocks of 8×8 pixels and macroblocks comprising six blocks, four of which are luminance blocks and two of which are chrominance blocks, can be used, as proposed in the standard.

In accordance with the invention, the motion estimator uses picture segments as proposed in appendix R. The motion vectors are then estimated inside the segment. However, as explained above, and at least for the edge blocks, the estimator uses motion vectors that are allowed to leave the segment.

The motion vectors of the blocks are transmitted to a motion compensation predictor 6. To produce an estimate the predictor also receives at its input a basic picture from a reference picture memory 8. Prediction with motion compensation is effected relative to the reference picture.

The motion compensation predictor supplies an estimated picture which is based on the reference picture and motion vectors and is fed to a subtract input of the subtracter 4 and to an input of an adder 10.

The subtracter 4 therefore receives the input video picture and an estimated picture based on a reference picture contained in the basic picture memory. The estimated picture is subtracted from the video picture fed to the input in a compression coder 12, typically a discrete cosine transform coder. Quantizing is then carried out in a quantizer 14, preferably with a variable quantizing step. The output of the quantizer 14 is applied to a variable length coder 16 and to a quantizing inverter 18, which carries out the converse operation. The converse of the transform applied by the decoder 12 is applied at the output 20 of the quantizing inverter 18. The difference between the input picture and the estimated picture, as reconstituted after reception in the associated decoding system shown in FIG. 2, and in the absence of transmission errors, is obtained at the output of the coding inverter 20. This difference is fed to input of the adder 10. The adder 10 therefore outputs to the reference picture memory a picture such as could be obtained after reception in the decoding system, possibly affected by transmission errors.

The variable length coder receives the outputs of the coder 14 and the motion estimator 2, in other words the difference between the input picture and the estimated picture and the motion vectors. The output of the VLC is fed to a video buffer 22 before transmission over the channel; of course, the video signal could be multiplexed with audio or other signals before transmission; this is known in the art and has no effect on the functioning of the invention. If the quantizing step is variable, the quantity of information in the buffer can be used to control the quantizing step, as shown in FIG. 3 by an arrow connecting the buffer 22 to the quantizer 14.

The coder in accordance with the invention differs from a prior art coder in that the motion estimator also considers macroblocks outside the current segment, for example macroblocks in the adjacent groups of blocks. Note that the coder for decoding signals supplied by the coder in accordance with the invention does not differ from a prior art decoder.

Of course, the present invention is not limited to the examples and embodiments described and shown, many variants of which will suggest themselves to the skilled person. It is clear that the definition of the macroblocks or segments given above is merely one example, and that the invention also applies to other definitions of picture segments, blocks and macroblocks. Thus the picture could be divided into vertical segments, in which case the scanning direction and the macroblocks to which the invention would be applied could change.

The invention claimed is:

1. A picture coding method for transmission on a channel at a low bit rate and with a high error rate, which method uses motion estimation coding and divides the picture into a plurality of segments separated by synchronization signals, with each segment made up of macroblocks, wherein, at least for an edge block of a segment, a motion estimation vector is allowed to extend across a synchronization signal into an adjacent segment.

2. The method of claim 1, wherein, for an edge macroblock of a segment, a motion estimation vector is allowed to extend into an adjacent macroblock of the adjacent segment.

3. The method of claim 1, wherein, for motion vector estimation, the picture is scanned from left to right and from top to bottom and, for macroblocks adjacent the top edge of a segment, a motion estimation vector is allowed to extend into an adjacent segment.

4. The method of claim 1, wherein, for motion vector estimation, the picture is scanned from left to right and from top to bottom and, for macroblocks adjacent the right-hand edge of a segment, a motion estimation vector is allowed to extend into an adjacent segment.

5. The method according to claim 1, wherein each segment is made up of two groups of blocks.

6. The method of claim 1, wherein the error rate is greater than $10^{-6}$, or even greater than $10^{-4}$.

7. The method according to claim 1, wherein the transmission rate is less than 100 kbit/s.

8. A coder implementing the method of claim 1.

9. A transmission system using a channel at a low bit rate and with a high error rate, the system including a coder according to claim 8.

10. A picture coding method for transmission on a channel at a low bit rate and with a high error rate, the method comprising:
performing motion estimation coding on transmitted data of a picture;
dividing the picture into a plurality of segments separated from one another by synchronization signals, with each segment comprising one or more macroblocks,
wherein, at least for an edge block of a corresponding segment of the picture, a respective motion estimation vector is permitted to extend across a synchronization signal into an adjacent segment.

11. A picture coding method as claimed in claim 10, wherein said performing motion estimation coding comprises estimating all motion vectors except for the edge block of the corresponding segment inside the segment.

12. A picture coding method as claimed in claim 10 wherein said performing motion estimation coding and said dividing the picture into a plurality of segments are performed in accordance with ITU standard H.263+.

13. A picture coding method as claimed in claim 11 wherein said performing motion estimation coding and said dividing the picture into a plurality of segments are performed in accordance with ITU standard H.263+.

* * * * *